United States Patent
Kaplinsky et al.

(10) Patent No.: US 7,528,866 B2
(45) Date of Patent: May 5, 2009

(54) METHOD AND APPARATUS FOR MANAGING INTEGRATION TIME OF IMAGERS

(75) Inventors: Michael Kaplinsky, Sierra Madre, CA (US); Igor Subbotin, South Pasadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 322 days.

(21) Appl. No.: 11/523,094

(22) Filed: Sep. 19, 2006

(65) Prior Publication Data

US 2007/0052817 A1    Mar. 8, 2007

Related U.S. Application Data

(63) Continuation of application No. 10/315,213, filed on Dec. 10, 2002, now Pat. No. 7,142,234.

(51) Int. Cl.
    *H04N 9/73*    (2006.01)
(52) U.S. Cl. .................................... 348/226.1; 348/308
(58) Field of Classification Search ............. 348/226.1, 348/228.1
    See application file for complete search history.

(56) References Cited

U.S. PATENT DOCUMENTS

| | | | |
|---|---|---|---|
| 7,142,234 B2* | 11/2006 | Kaplinsky et al. | 348/226.1 |
| 2003/0067546 A1 | 4/2003 | Asano | |
| 2004/0201729 A1 | 10/2004 | Poplin et al. | |

* cited by examiner

*Primary Examiner*—David L Ometz
*Assistant Examiner*—Dillon Durnford-Geszvain
(74) *Attorney, Agent, or Firm*—Dickstein Shapiro LLP

(57) ABSTRACT

The integration time for an imager is adjusted to be an integer multiple of the light intensity received by the imager to reduce or eliminate flickering.

13 Claims, 8 Drawing Sheets

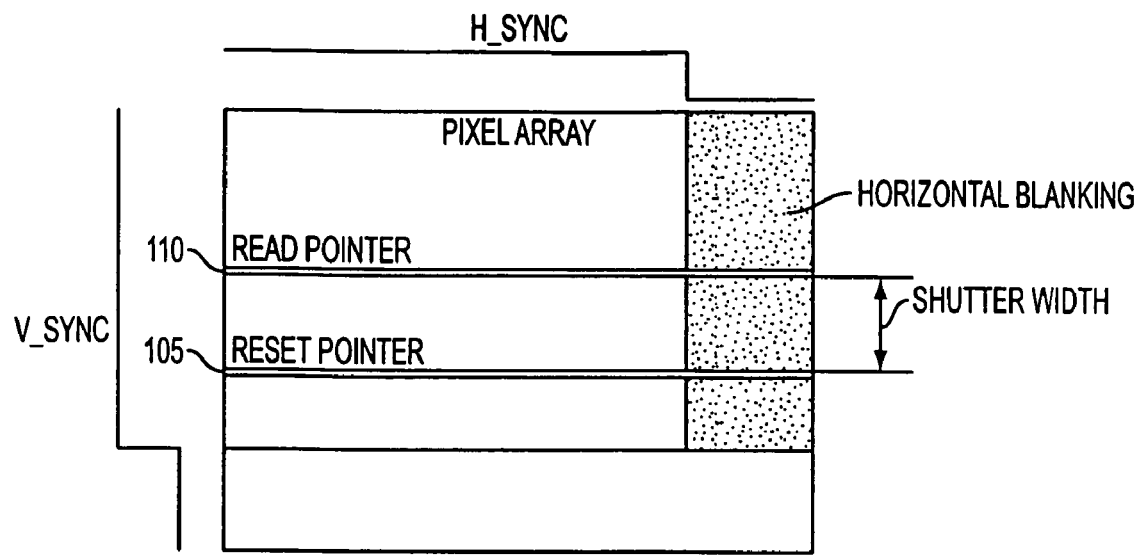
FIG. 1
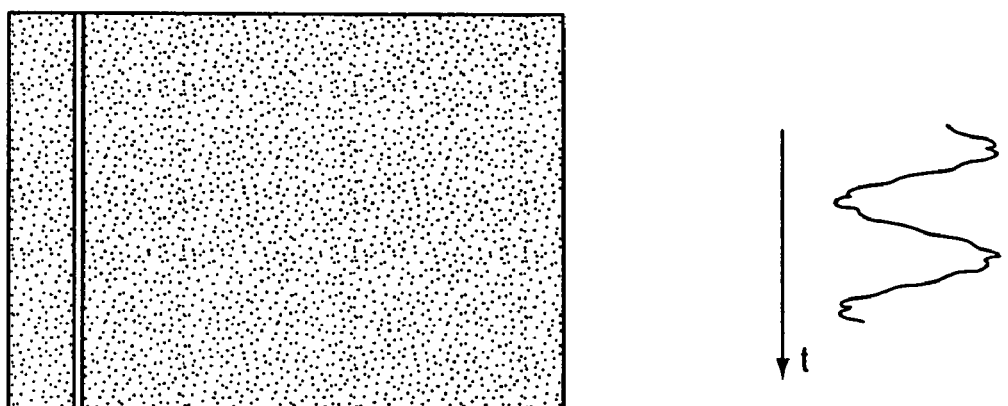
FIG. 2
FIG. 3

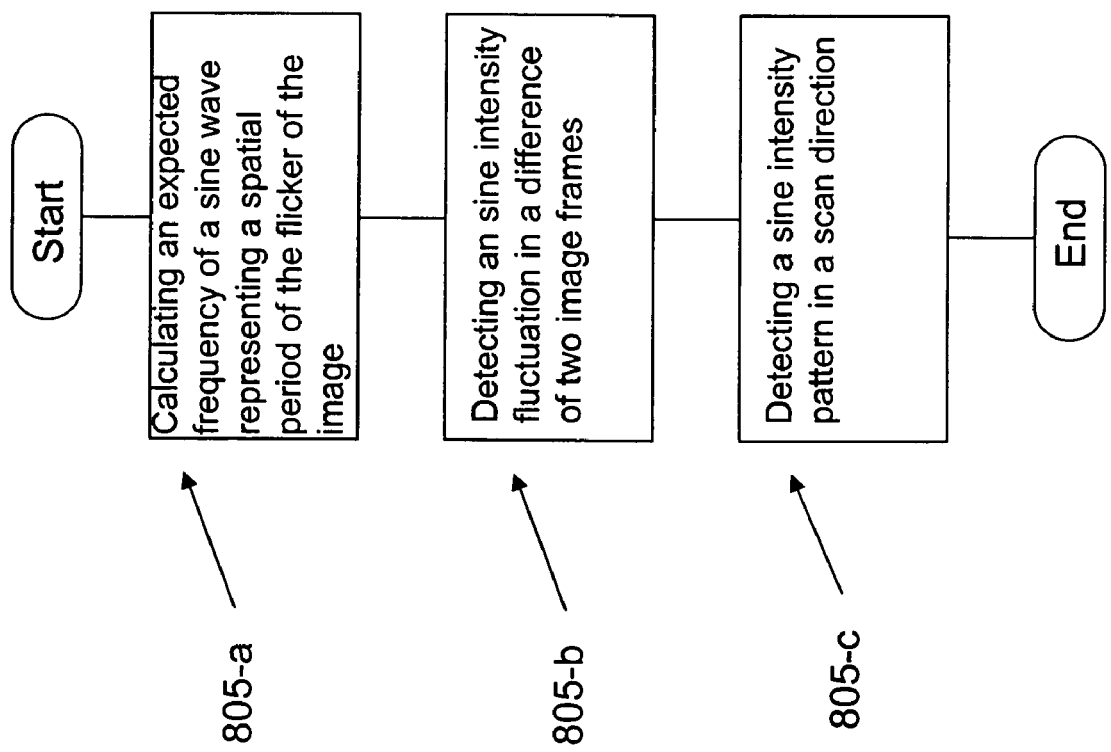

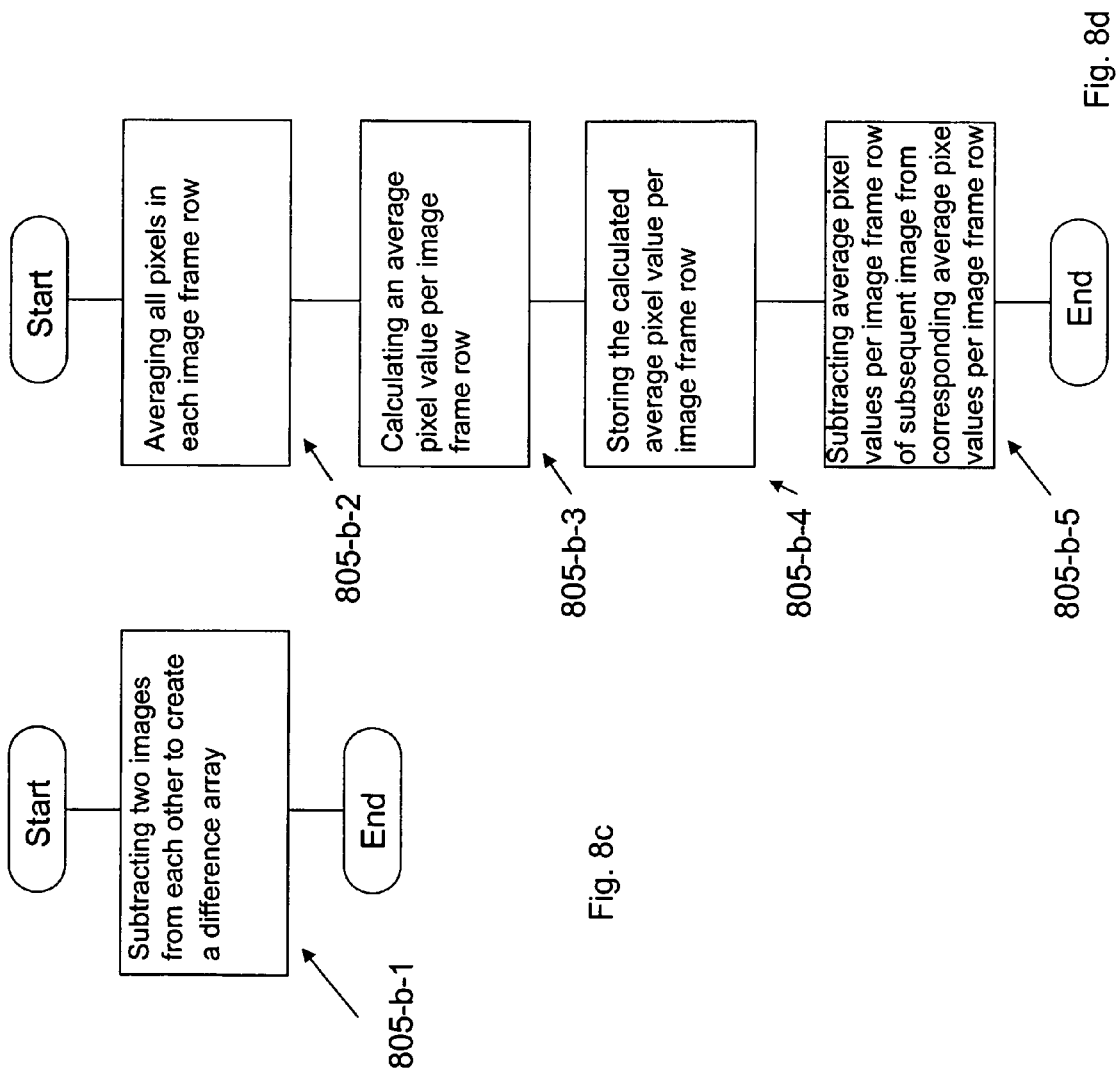

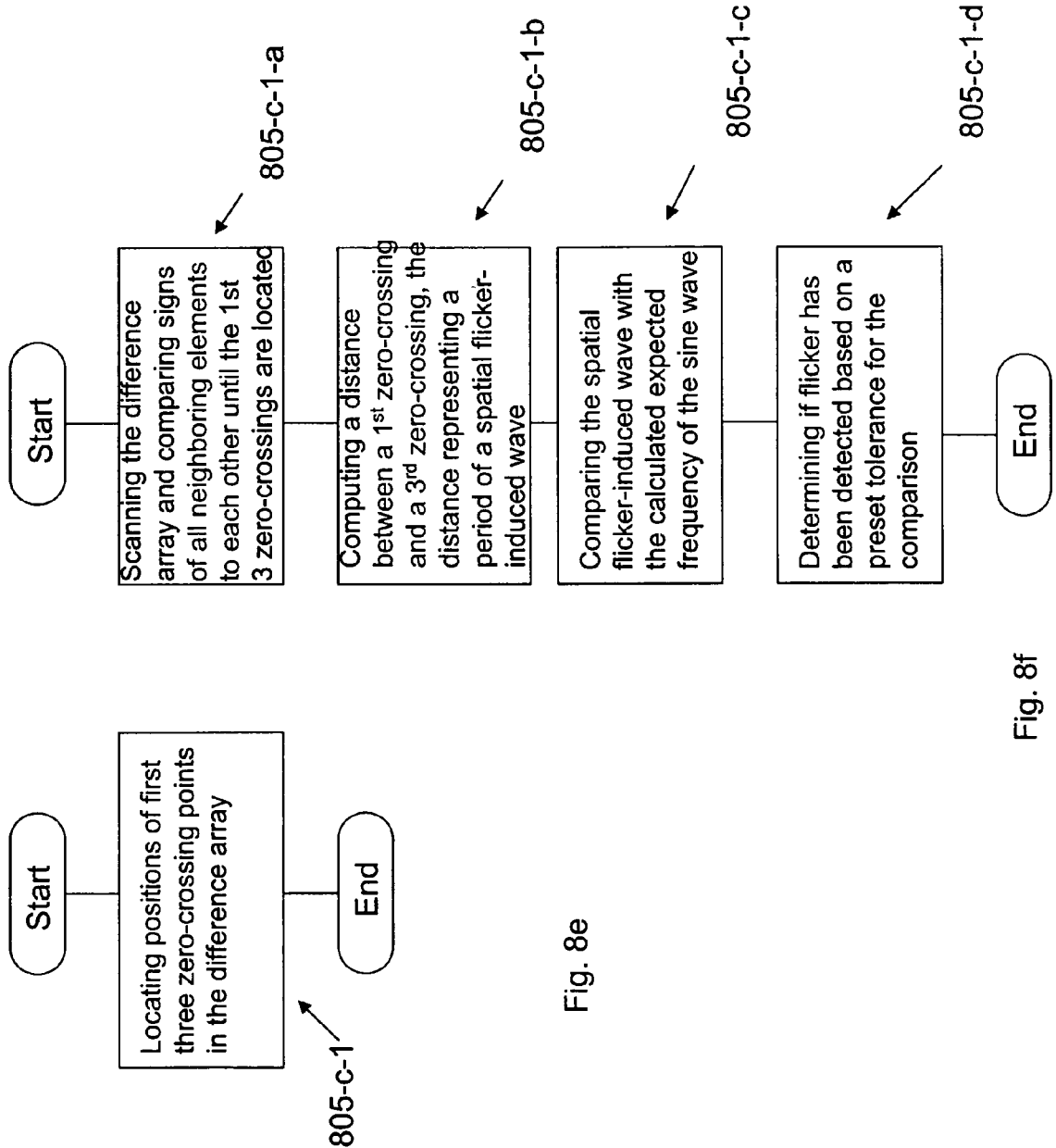

METHOD AND APPARATUS FOR MANAGING INTEGRATION TIME OF IMAGERS

This application is a continuation application of application Ser. No. 10/315,213, filed Dec. 10, 2002, now U.S. Pat. No. 7,142,234 which is hereby incorporated herein by reference in its entirety.

FIELD OF THE INVENTION

The present invention generally relates to the field of imagers and imaging systems and, in particular to imagers and image systems using a rolling shutter.

BACKGROUND OF THE INVENTION

In many modern CMOS imagers employing pixel arrays the optical integration time is controlled by the method known as "rolling shutter". This approach utilizes at least two pointers, Reset and Read, that continuously move through the pixel array image frame from top to bottom jumping from line to line at line-time intervals. First, the Reset pointer 105 starts the integration for all pixels in the line. Some time later the Read pointer 110 reaches the same line and initiates signal readout. This is illustrated in FIG. 1, which depicts a pixel array. The distance in lines between the two pointers is referred to as shutter width 115. Shutter width multiplied by the line time gives the duration of the optical integration time.

The use of "rolling shutter" approach allows an equal optical integration time for all pixels in an image frame to be achieved. However, this optical integration does not happen for all pixels simultaneously with the actual time interval used for integration dependent on the vertical position of the pixel in an image frame. Under certain conditions described below, this method of integration time control leads to the possibility of flicker or "running bands" in the image frame.

Conventional imagers avoid flicker either by off-line specification of the AC frequency or by auto-detection techniques that rely on detecting temporal flicker frequency, typically in the middle of an image frame.

BRIEF DESCRIPTION OF THE DRAWINGS

FIG. 1 is a pixel array showing rolling shutter operation;
FIG. 2 is a typical image with flicker;
FIG. 3 shows the vertical intensity profile of the image of FIG. 2;
FIG. 8b is a flowchart of the first detecting step of FIG. 8a;
FIG. 8c is a flowchart of an embodiment of step 805-b of FIG. 8b;
FIG. 8d is a flowchart of an alternative embodiment of step 805-b of FIG. 8b;
FIG. 8e is a flowchart of detecting step 805-c of FIG. 8b;
FIG. 8f is a flowchart of an embodiment of step 805-c-1 of FIG. 8e.

DETAILED DESCRIPTION OF THE INVENTION

Figure 4:
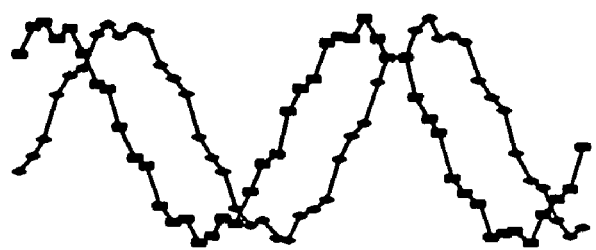
FIG. 4 shows typical vertical profiles for two sequential image frames with flicker.

Most fluorescent illuminators produce alternate light intensity. Irradiated light intensity, L(t), has the frequency that is twice that of AC power supply in use, f(t).

$$L(t) = A \sin(2\pi ft)^2 \tag{1}$$

Signal level accumulated in the pixels of CMOS image sensor with rolling shutter operation is proportional to the integration time IT (exposure or shutter width). Flicker occurs when the shutter width is not an integer multiple of the period of the light intensity. In imagers with rolling shutter operation, flicker manifests itself as dark and bright bands "running" through the image. In this situation, the signal accumulated by the pixels in a given row depends on the phase relationship between optical integration time and the period of the light intensity fluctuation. This can be expressed as an integral of light intensity over integration time as:

$$g(T_0) = \int_{T_0}^{T_0+IT} L(t)dt \tag{2}$$

$$= \frac{A}{4\pi \cdot f}(2\pi \cdot f \cdot IT + \cos(2\pi \cdot f(2T_0 + IT)) \cdot \sin(2\pi \cdot fIT)$$

where $T_0$ is the time corresponding to the beginning of the optical integration for the given row, and IT is the duration of the optical integration.

The typical image resulting from operating an image sensor with rolling shutter width not being an integer multiple of the light intensity period is shown in FIG. 2. FIG. 3 is a graph of the vertical intensity profile of the image in FIG. 2.

The number (spatial frequency) of the dark and bright stripes in the image depends solely on shutter speed (time elapsed between the beginning of optical integration for the first and last rows) and does not depend on the actual duration of the integration time (shutter width). However, the amplitude of the intensity bands in the image does depend on the shutter width, as can be inferred from Equation (2).

The "speed" of the running stripes depends on the light intensity phase difference corresponding to the time elapsed between the reset pointer hitting the same row in two subsequent frames. Therefore, for a given speed of rolling shutter pointers, the "phase shift" of the flicker between adjacent frames depends solely on the time elapsed between the corresponding rows in two sequential frames (frame time).

The method of the present invention reduces the task of detecting flicker to detecting a spatial sine wave in the image. This is accomplished by subtracting two frames from each other to create a difference array. The subtraction reduces or eliminates image content from the frames and makes the detection process independent of image content. This method can be practiced based on a very short sequence of frames (as few as two frames) and is virtually insusceptible to motion of the image content.

The method of the present invention is based on the detection of the flicker by detecting the presence of certain spatial intensity periodicity along the scan direction of the frame. For a single frame this spatial frequency can be obtained by expressing optical integration start time, $T_0$, in Equation (2) as a function of the line number, Line#, along the frame scan.

The rolling shutter pointers pass all lines in the frame (active and vertical blanking) during the frame time. Therefore, if at time 0, $T_0$, the Reset pointer is at the beginning of the frame, then the time when reset pointer starts the integration of pixels on Line# can be expressed as:

$$T_0 = \frac{\text{Line\#} \, FT}{FrameSize} \qquad (3)$$

where FT is the total frame time.

The expected spatial flicker frequency can be obtained by substituting Equation (3) into Equation (2). However, due to the presence of arbitrary image content, the direct detection of the specific spatial frequency from a single frame is not feasible. In order to allow for detection of the flicker-induced spatial frequency in the image frame for any image content, two image frames are subtracted from each other. This will eliminate static image content while preserving image intensity fluctuations due to flicker. This is due to the further fact that frame time, in general, is not integer multiple of the flicker frequency, the flicker-induced intensity fluctuations in two consecutive image frames will have different phase.

For a given image frame time, FT, and integration time, IT, and assuming that image content changes much slower than the image frame rate, the expected spatial flicker induced image intensity fluctuations in the difference image, $\Delta g$ can be evaluated as:

$$\Delta g(\text{Line\#}) = \int_{T_0}^{T_0+IT} L(t)dt - \int_{T_0+FT}^{T_0+IT+FT} L(t)dt \qquad (4)$$

$$= \frac{A \cdot \sin(2\pi \cdot f \, IT)}{2\pi \cdot f}(\sin(2\pi \cdot f(2T_0 + 2IT + FT)) \cdot$$

$$\sin(2\pi \cdot f \, ZFT)$$

$$= \Delta A(FT, IT)\sin\left(4\pi \cdot f \frac{\text{Line\#} \, FT}{FrameSize\_in\_Lines} + \text{Phase}\right)$$

where $\Delta A$ is the amplitude of the difference image.

Equation (4) allows the calculation of the expected spatial period of the flicker in the image frame as function of total vertical image frame size, FrameSize_in_Lines, frequency of AC power supply f, and the current frame time of the camera FT. For example, for an frame with 523 total lines (active and blanking), 60 Hz AC and image frame time of ⅓₀ sec, the spatial period of flicker (if any) will be 523*25/60≈109 lines. Therefore, in this example, a VGA imager with 480 active lines will show approximately 4.4 periods of flicker-induced sine intensity fluctuations.

Figure 5:
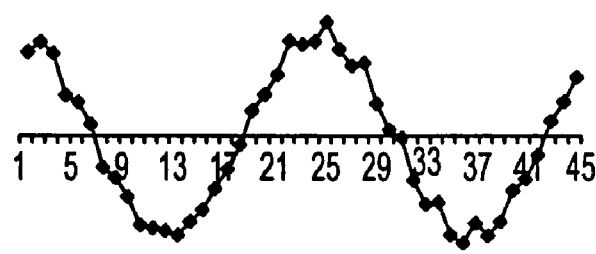
FIG. 5 shows the difference between the first profile and the second profile depicted in FIG. 4.

Based on the above considerations, the task of flicker detection can be achieved by detecting sine image intensity fluctuation in the differences of two image frames, where the expected frequency of the sine wave can be calculated from Equation (4). Typical flicker profiles for two sequential image frames are shown in FIG. 4. The difference between these profiles is shown in FIG. 5. Therefore, the flicker detection method of the present invention, calls for subtraction of two image frames and detecting the sine intensity pattern in the direction of the scan with expected frequency given by Equation (4).

In order to reduce required memory storage and to avoid the effects of temporal noise, all the pixels in each line are averaged and a single average value-per image frame row/line will be stored for subsequent subtraction from a later image frame. On the subsequent image frame, the average pixel values for each row are subtracted from the corresponding stored values. According to the method of the present invention, the resulting difference array is analyzed for the presence of sine wave with the period defined by Equation (4) for the current operating conditions of the imager.

In order to further reduce the effects of noise and sampling discreteness on the frequency detection process, the first step of difference array processing is array smoothing. Array smoothing can be accomplished by the substitution of each element of the difference array with an average of some number of nearest neighbors, where N is the number of nearest neighbors.

$$f_j^{new} = \left(\sum_{i=j-N}^{i=j+N} f_i^{old}\right) \bigg/ (2 \cdot N + 1) \qquad (5)$$

Figure 6:
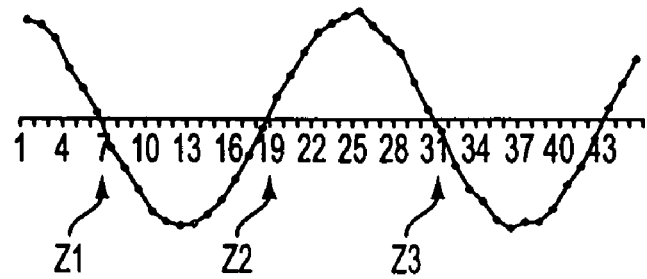
FIG. 6 shows the smoothed array of FIG. 5 in accordance with the present invention.

FIG. 6 shows the results of array smoothing for N=3.

If the expected spatial frequency is present in the difference image, the determination of the flicker-induced spatial frequency is based on finding the positions of the first three zero-crossing points in the array. This is achieved by scanning the entire difference array and comparing the signs of all neighboring elements. Once the three zero-crossing points, Z1, Z2 and Z3, are located, it can be assumed that the distance in image frame lines between the first zero-crossing point, Z1, and the third zero-crossing point, Z3, is the period of the spatial flicker-induced wave. This is also illustrated in FIG. 6. This period is then compared with the expected period as computed from Equation (4). If, within certain tolerance, the detected and expected periods of the spatial intensity wave match, then the presence of the flicker in the image frame is detected.

The stability of the detection algorithm can be further improved by requiring a number of repeated flicker "detections" within a set period of time. Alternatively, more than three zero-crossing points can be required for accurate detection of the spatial wave period.

The stability of the flicker detection method can be further improved by proper selection of the frames to be subtracted from each other for the purpose of spatial frequency detection. It is clear that the method of the present invention will have higher accuracy of flicker detection for higher amplitude of the spatial wave in the difference image, since the temporal noise and sampling discreteness would have less effect on the detection process. It can be noted from Equation (4) that the amplitude of the difference image, ΔA (FT, IT), can be maximized by proper selection of the distance between image frames to be subtracted. Specifically, if two image frames being subtracted are spaced apart by "n" image frames (where "n" is a small integer number of image frames), then the value of image frame time in Equation (4) is (n+1) times larger. Based on these considerations, for each pair of IT and FT there exists a (small) value "n" such that by skipping "n" image frames between the two image frames to be subtracted, maximizes the amplitude of the flicker wave in the difference image.

Once the flicker is detected, the optical integration time (shutter width) of the imager can be adjusted so that integration time is an integer multiple of light intensity period. One exemplary method for this adjustment is based on changing the horizontal blanking time of the imager, thus extending the duration of each line. If shutter width is specified in terms of a count of scan lines, then the rest of the imager settings as well as auto-exposure algorithm should not be affected by this adjustment.

Figure 7:
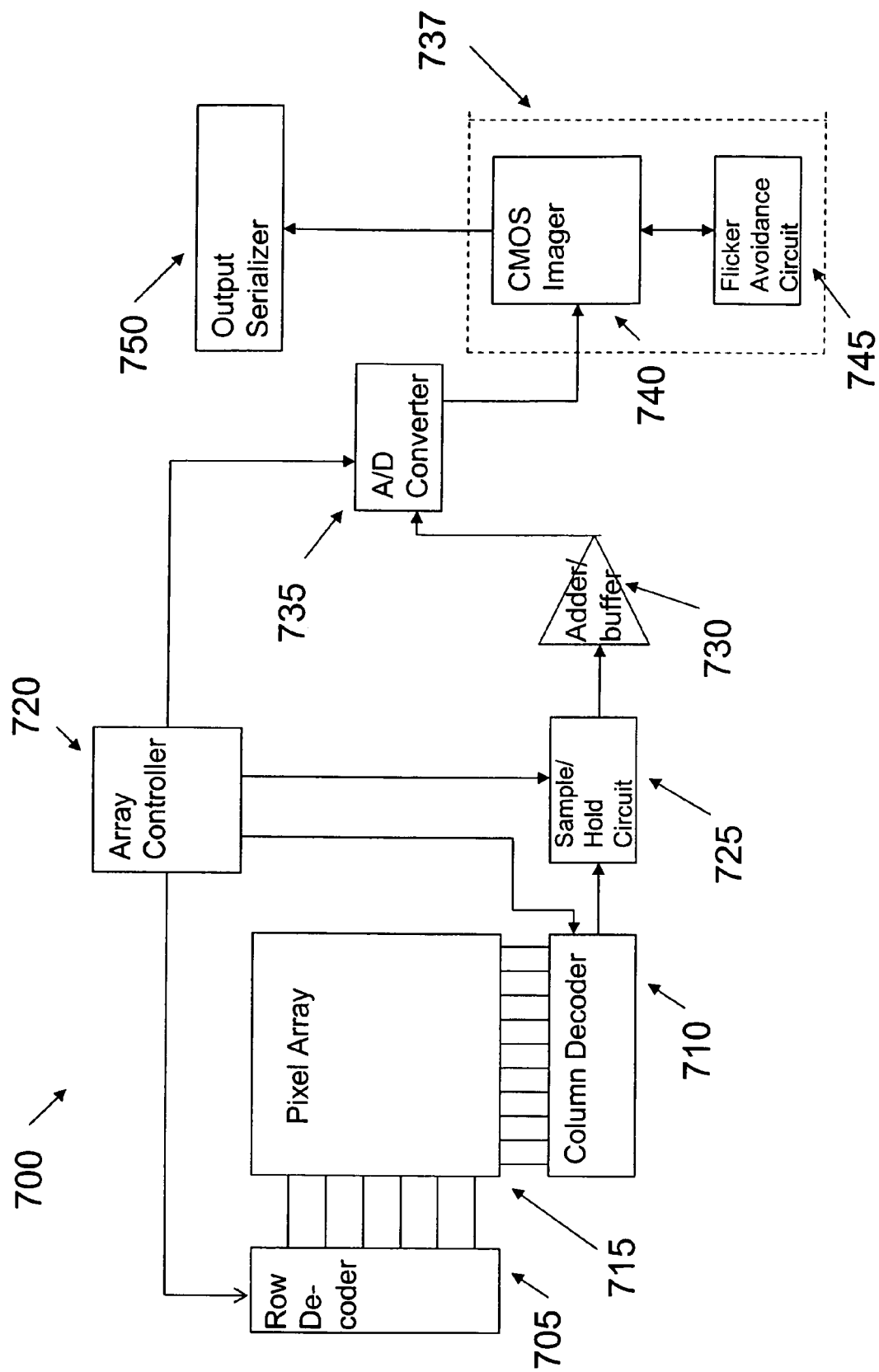
FIG. 7 is a block diagram of an exemplary digital camera system using the image processor of the present invention having a flicker avoidance circuit.

FIG. 7 depicts a digital camera system 700 which may utilize a image processor having a flicker avoidance circuit of the present invention. Row decoder 705 and column decoder 710 are coupled to pixel array 715 and effect the selection of a pixel of pixel array 715. Array controller 720 is coupled to both row decoder 705 and column decoder 710 and determines which row and column are activated. Column decoder 710 and array controller 720 are both coupled to sample/hold circuit 725, which is coupled to adder/buffer 730. Analog-to-digital (A/D) converter 735 accepts input from and is coupled to array controller 720 and adder/buffer 730 and outputs digital signals to image processor 737, which may include an image processor circuit, such as CMOS Imager 740, using a rolling shutter and flicker avoidance circuit 745. An image processor circuit, such as CMOS Imager 740 of image processor 737, may output digital signals to output serializer 750 for further image processing by a computer or processing system.

Figure 8A:
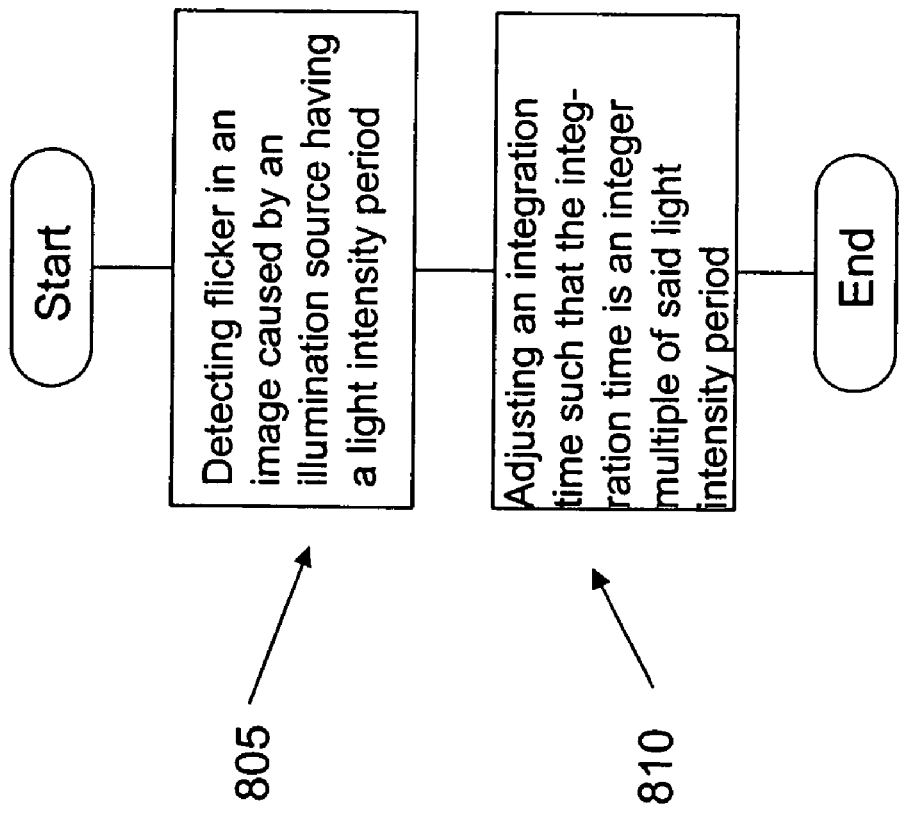
FIG. 8a is a flowchart of the method of flicker avoidance of the present invention.

FIG. 8a is a flowchart of the method of flicker avoidance of the present invention. At step 805 flicker, caused by an illumination source having a non-zero light intensity period, is detected in an image and at step 810 the integration time is adjusted such that the integration time is an integer multiple of the light intensity. In one exemplary method the adjustment is based on changing the horizontal blanking time.

FIG. 8b is a flowchart of an embodiment of detecting step 805 of FIG. 8a. Flicker detection is accomplished by the following steps: step 805-a calculates an expected frequency of a sine wave representing a spatial period of the flicker in the image; step 805-b detects a sine wave intensity fluctuation in a difference of two image frames; and step 805-c detects a sine intensity pattern in a scan direction.

FIG. 8c is a flowchart of an embodiment of step 805-b of FIG. 8b. In this embodiment, step 805-b-1 accomplishes the sine intensity fluctuation detection by subtracting two image frames from each other to create a difference array. FIG. 8d is an alternative embodiment in which the sine intensity fluctuation detection is accomplished by the following steps: steps 805-b-2 averages all pixels in each image frame row; step 805-b-3 calculates an average pixel value per image frame row; step 805-b-4 stores the calculated average pixel value per image frame row; and step 805-b-5 subtracts average pixel values per image frame row of a subsequent image frame from corresponding stored average pixel values per image frame row. In yet another alternative embodiment (not shown), the subtracting step (step 805-b-1) of FIG. 8c further includes the step of smoothing the difference array created by the subtracting step (step 805-b-1) and the smoothing step further includes the step of substituting each element of the difference array with an average of some of said each element's nearest neighbors.

FIG. 8e is a flowchart of step 805-c of FIG. 8b. Step 805-c-1 accomplishes the detection of a sine intensity pattern by locating the first three zero-crossings in the difference array. An alternative embodiment of step 805-c of FIG. 8b (not shown) is to accomplish the detection of a sine intensity pattern by locating the first three zero-crossings in the smoothed difference array. In yet another alternative embodiment of step 805-c of FIG. 8b the detection of a sine intensity pattern is accomplished by the location of a plurality of zero-crossings in the difference array or in yet another alternative in the smoothed difference array.

FIG. 8f is a flowchart of step 805-c-1 of FIG. 8e. Step 805-c-1 is accomplished by the following steps: step 805-c-1-a scans the difference array and compares the signs of all the neighboring elements until the first three zero-crossing are located; step 805-c-1-b computes a distance between a first zero-crossing point and a third zero-crossing point, where the distance between the first zero-crossing point and the third zero-crossing point represents a period of a spatial flicker-induced wave; step 805-c-1-c compares the period with the calculated expected frequency of the sine wave; and step 805-c-1-d determines if flicker has been detected based on a preset tolerance between the period of the spatial flicker-induced wave and the calculated expected frequency of the sine wave. Alternative embodiments of FIG. 8f (not shown) are to perform the same steps on a smoothed difference array; to perform the same steps locating a plurality of zero-crossing points on a difference array; and to perform the same steps locating a plurality of zero-crossing points on a smoothed difference array.

Figure 9:
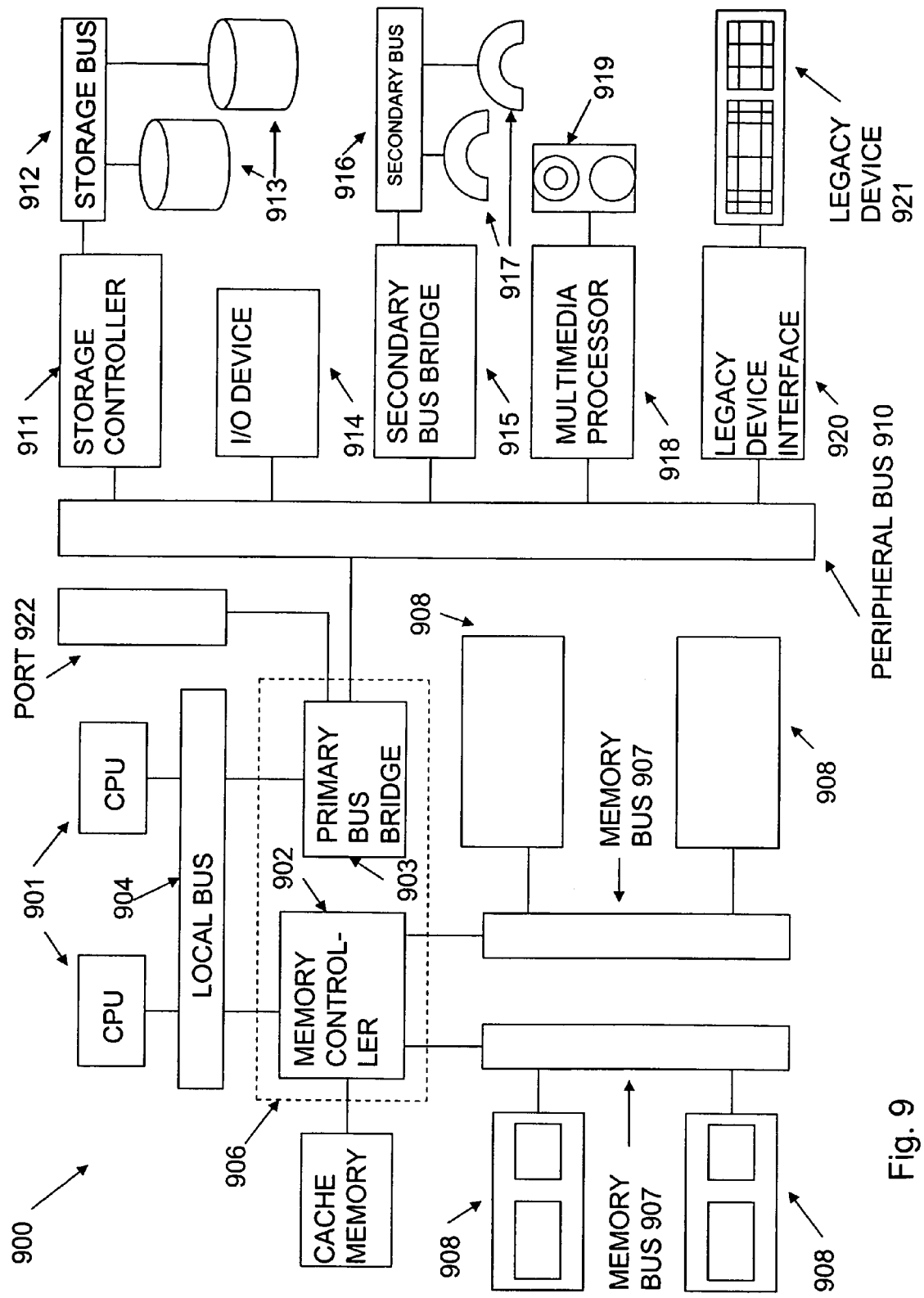
FIG. 9 is a block diagram of a computer system having an imager using rolling shutter and the method of the present invention for achieving flickerless operation.

FIG. 9 illustrates an exemplary processing system 900, such as a work station or computer, which may utilize an electronic device comprising an imager using a rolling shutter and the flicker avoidance method in accordance with any of the embodiments of the present invention disclosed above in connection with FIGS. 4-8. The processing system 900 includes one or more processors 901 coupled to a local bus 904. A memory controller 902 and a primary bus bridge 903 are also coupled the local bus 904. The processing system 900 may include multiple memory controllers 902 and/or multiple primary bus bridges 903. The memory controller 902 and the primary bus bridge 903 may be integrated as a single device 906.

The memory controller 902 is also coupled to one or more memory buses 907. Each memory bus accepts memory components. Examples of memory modules include single inline memory modules (SIMMs) and dual inline memory modules (DIMMs). For example, in a SIMM or DIMM, the additional device 909 might be a configuration memory, such as a serial presence detect (SPD) memory. The memory controller 902 may also be coupled to a cache memory 905. The cache memory 905 may be the only cache memory in the processing system. Alternatively, other devices, for example, processors 901 may also include cache memories, which may form a cache hierarchy with cache memory 905. If the processing system 900 include peripherals or controllers which are bus masters or which support direct memory access (DMA), the memory controller 902 may implement a cache coherency protocol. If the memory controller 902 is coupled to a plurality of memory buses 907, each memory bus 907 may be operated in parallel, or different address ranges may be mapped to different memory buses 907.

The primary bus bridge 903 is coupled to at least one peripheral bus 910. Various devices, such as peripherals or additional bus bridges may be coupled to the peripheral bus 910. These devices may include a storage controller 911, an miscellaneous I/O device 914, a secondary bus bridge 915, a multimedia processor 918, and an legacy device interface 920. The primary bus bridge 903 may also coupled to one or more special purpose high speed ports 922. In a personal computer, for example, the special purpose port might be the Accelerated Graphics Port (AGP), used to couple a high performance video card to the processing system 900. Output serializer 750 may provide input to a computer or processing system 900 for further image processing via I/O device 914.

The storage controller 911 couples one or more storage devices 913, via a storage bus 912, to the peripheral bus 910. For example, the storage controller 911 may be a SCSI controller and storage devices 913 may be SCSI discs. The I/O device 914 may be any sort of peripheral, such as output serializer 750 or I/O device 914 may be an local area network interface, such as an Ethernet card. Specifically, a digital camera system having a CMOS imager, employing a pixel array and having a flicker avoidance circuit of the present invention, may interface with computer system 900 as an I/O device 914. The secondary bus bridge may be used to interface additional devices via another bus to the processing system. For example, the secondary bus bridge may be an universal serial port (USB) controller used to couple USB devices 917 via to the processing system 900. The multimedia processor 918 may be a sound card, a video capture card, or any other type of media interface, which may also be coupled to one additional devices such as speakers 919. Multimedia processor 918 may be a digital camera system 700 having a image processor employing a pixel array and having a flicker avoidance circuit, which may interface with a computer or processing system for further image processing. The legacy device interface 920 is used to couple legacy devices, for example, older styled keyboards and mice, to the processing system 900.

The processing system 900 illustrated in FIG. 9 is only an exemplary processing system with which the invention may be used. While FIG. 9 illustrates a processing architecture especially suitable for a general purpose computer, such as a personal computer or a workstation, it should be recognized that well known modifications can be made to configure the processing system 900 to become more suitable for use in a variety of applications. For example, many electronic devices which require processing may be implemented using a simpler architecture which relies on a CPU 901 coupled to image processor 908 and/or memory buffer devices 904. These electronic devices may include, but are not limited to audio/video processors and recorders, gaming consoles, digital television sets, wired or wireless telephones, navigation devices (including system based on the global positioning system (GPS) and/or inertial navigation), and digital cameras and/or recorders. The modifications may include, for example, elimination of unnecessary components, addition of specialized devices or circuits, and/or integration of a plurality of devices.

The image processor, image processor circuit and the exemplary flicker avoidance circuit described above may be implemented in software, hardware, firmware, application specific integrated circuits (ASICs), field programmable gate arrays (FPGAs) or any combinations of the above or their equivalent.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

The invention claimed is:

1. A method of dynamically adjusting the integration time of an imager, the method comprising:
   detecting a light intensity period from an image; and
   adjusting the integration period of the imager to be an integer multiple of the light intensity period,
   wherein the detecting a light intensity further comprises:
      calculating an expected frequency of a sine wave, the sine wave representing a spatial period of the flicker in the image frame;
      detecting a sine wave intensity fluctuation in a difference of two image frames; and
      detecting a sine intensity pattern in a direction of a scan.

2. The method according to claim 1, wherein the detecting a sine wave intensity fluctuation further comprises subtracting two image frames from each other to create a difference array.

3. The method according to claim 2, wherein the detecting a sine intensity pattern comprises locating positions of first three zero-crossing points in the difference array.

4. The method according to claim 2, wherein the adjusting comprises changing a horizontal blanking time of the imager.

5. The method according to claim 2, wherein the imager comprises a CMOS imager.

6. The method according to claim 3, further comprising smoothing the difference array.

7. The method according to claim 6, wherein the smoothing further comprises substituting each element of the difference array with an average of some of the each element's nearest neighbors.

8. The method according to claim 6, wherein the detecting a sine intensity pattern comprises locating positions of first three zero-crossing points in the smoothed difference array.

9. The method according to claim 2, wherein the detecting a sine intensity pattern comprises locating positions of a plurality of zero-crossing points in the difference array.

10. The method according to claim 3, wherein the subtracting two image frames further comprises selecting the two image frames to be subtracted from each other to be "n" image frames apart, where "n" is a small integer number of image frames.

11. The method according to claim 2, wherein the detecting a sine wave intensity fluctuation is repeated for a preset period of time.

12. A method of capturing an image using an imager, the method comprising:
   receiving an image;
   detecting a light intensity period from the image; and
   adjusting the integration period of the imager to be an integer multiple of the light intensity period,
   wherein the detecting a light intensity further comprises:
      calculating an expected frequency of a sine wave, the sine wave representing a spatial period of the flicker in the image frame;
      detecting a sine wave intensity fluctuation in a difference of two image frames; and
      detecting a sine intensity pattern in a direction of a scan.

13. An image processor for achieving flickerless operation of images comprising:
   an imager using a rolling shutter; and
   a flicker avoidance circuit, the flicker avoidance circuit configured to:
      detect a light intensity period from an image; and
      adjust the integration period of the imager to be an integer multiple of the light intensity period,
      wherein the detecting a light intensity further comprises:
         calculating an expected frequency of a sine wave, the sine wave representing a spatial period of the flicker in the image frame;
         detecting a sine wave intensity fluctuation in a difference of two image frames; and
         detecting a sine intensity pattern in a direction of a scan.

* * * * *